United States Patent
Masucci et al.

(10) Patent No.: US 6,592,272 B1
(45) Date of Patent: Jul. 15, 2003

(54) BURST MODE TRANSMISSION OVER MULTIPLE OPTICAL WAVELENGTHS

(75) Inventors: Jeffrey A. Masucci, Windham, NH (US); S. Martin Mastenbrook, Concord, MA (US); Colby Dill, III, Holliston, MA (US)

(73) Assignee: Quantum Bridge Communications, Inc., North Andover, MA (US)

(*) Notice: Subject to any disclaimer, the term of this patent is extended or adjusted under 35 U.S.C. 154(b) by 0 days.

(21) Appl. No.: 09/425,254

(22) Filed: Oct. 22, 1999

(51) Int. Cl.$^7$ ................................................ H04J 14/00
(52) U.S. Cl. ........................ 398/47; 398/71; 398/99; 398/100; 398/154
(58) Field of Search ............................. 359/123, 125, 359/137, 158, 136; 398/47, 71, 99, 100, 154

(56) References Cited

U.S. PATENT DOCUMENTS

| | | | |
|---|---|---|---|
| 5,173,899 A | 12/1992 | Ballance | 370/108 |
| 5,221,983 A | 6/1993 | Wagner | 359/125 |
| 5,327,277 A | 7/1994 | Van Der Plas et al. | 359/140 |
| 5,398,129 A | 3/1995 | Reimann | 359/137 |
| 5,479,451 A | 12/1995 | Eldering et al. | 375/343 |
| 5,572,349 A | 11/1996 | Hale et al. | 359/137 |
| 5,680,546 A | 10/1997 | Chiaretti et al. | 395/200.01 |
| 5,754,535 A | 5/1998 | Vandenabeele et al. | 370/321 |
| 5,774,244 A | 6/1998 | Tandon et al. | 359/125 |
| 5,848,070 A | 12/1998 | Durvaux et al. | 370/442 |
| 5,864,413 A | 1/1999 | Feldman et al. | 359/125 |
| 5,864,414 A | 1/1999 | Barnsley et al. | 359/125 |
| 5,864,415 A | 1/1999 | Williams et al. | 395/125 |
| 5,872,645 A * | 2/1999 | Proctor | 359/136 |
| 5,896,213 A | 4/1999 | Nagahori et al. | 359/137 |
| 5,896,474 A | 4/1999 | Van Deventer et al. | 385/24 |
| 5,907,587 A | 5/1999 | Sokoler | 375/368 |
| 5,926,478 A | 7/1999 | Ghaibeh et al. | 370/395 |
| 5,930,018 A | 7/1999 | Effenberger | 359/158 |
| 5,930,262 A | 7/1999 | Sierens et al. | 370/442 |
| 6,122,335 A * | 9/2000 | Colella et al. | 375/355 |

FOREIGN PATENT DOCUMENTS

EP    0 889 611 A1    1/1999

OTHER PUBLICATIONS

Denis J.G. Mestdagh; Fundamentals of Multiaccess Optical Fiber Networks; ISBN 0–89006; pp. 332–337; 1995.
ITU–T Recommendation G.983.1 "Broadbend Optical Access System Based on Passive Optical Networks (PON)", Oct. 1998.

* cited by examiner

Primary Examiner—Leslie Pascal
Assistant Examiner—Dzung Tran
(74) Attorney, Agent, or Firm—Hamilton, Brook, Smith & Reynolds, P.C.

(57) ABSTRACT

A method and system for using burst mode transmission on multiple optical wavelengths is disclosed. In a passive optical network, a synchronization signal is transmitted from a central terminal to remote terminals and burst data signals are transmitted from remote terminals to the central terminal. A first group of remote terminals transmits burst data signals in respective timeslots that are synchronized to the received synchronization signal and multiplexed at a first optical wavelength. A second group of remote terminals transmits burst data signals in respective timeslots that are synchronized to the received synchronization signal and multiplexed at a second optical wavelength. The timeslots are synchronized and phase aligned with each other such that optical crosstalk interference between adjacent optical wavelengths is avoided and each wavelength can be spectrally spaced as close as possible to adjacent wavelengths.

9 Claims, 9 Drawing Sheets

BURST MODE TRANSMISSION OVER MULTIPLE OPTICAL WAVELENGTHS

BACKGROUND OF THE INVENTION

In a shared medium optical network, such as a passive optical network (PON), which comprises multiple optical sources transmitting toward a single optical receiver, some method must be used to prevent data transmitted by one transmitter from interfering with data transmitted by the other transmitters. In this type of multipoint-to-single point network there are two methods commonly used to solve this problem: time division multiple access (TDMA) and wavelength division multiplexing (WDM). TDMA is used when all of the transmitters share a common optical wavelength or wavelength band. WDM is used when each transmitter uses a unique optical wavelength or wavelength band which does not interfere with those used by the other transmitters.

In TDMA optical systems each optical source transmits by bursting its information onto the common physical medium. Transmissions from different sources are made possible by offsetting, in time, the burst from each source so that none of the bursts overlaps, in time, with any other burst from any source. Otherwise, the transmissions from two or more sources could collide at some common point in the network, causing loss of data. The time allocated for a single burst of data from a given transmitter is called a "timeslot". In an optical TDMA network, all the transmitters typically use the same band of wavelengths with no separation among the sources in the optical frequency domain. This approach is referred to as "single wavelength TDMA".

In current WDM systems, the transmission mode used is a continuous one in which each transmitter is enabled all the time and is continuously modulated by on-off keying. There is no separation among sources in the time domain, but there is enough separation among sources in the optical frequency domain so that the wavelength of a given transmitter does not interfere with the wavelengths of the other transmitters at the optical receiver. This approach is referred to as "continuous mode WDM".

SUMMARY OF THE INVENTION

To increase network capacity and the number of transmitters that can share a multipoint-to-single point optical network, it would be advantageous to combine the sharing in the time domain provided by TDMA and the sharing in the optical wavelength/frequency domain provided by WDM.

The present invention relates to a method and system for using burst mode transmission on multiple optical wavelengths. This combination is referred to herein as "burst mode WDM" or, equivalently, "multiple wavelength TDMA".

Accordingly, a method of communicating between a central terminal and plural remote terminals over a passive optical network having downstream and upstream portions includes transmitting burst data signals from remote terminals to the central terminal over the upstream network portion. A first group of remote terminals transmits burst data signals in respective first timeslots that are multiplexed at a first optical wavelength. A second group of remote terminals transmits burst data signals in respective second timeslots that are multiplexed at a second optical wavelength.

According to an embodiment, each upstream wavelength carrying burst mode transmissions can be spectrally spaced as close as possible to adjacent wavelengths. Accordingly, a method of communicating between a central terminal and plural remote terminals includes transmitting a synchronization signal from the central terminal to the remote terminals over the downstream network portion and transmitting burst data signals from remote terminals to the central terminal over the upstream network portion. A first group of remote terminals transmits burst data signals in respective first timeslots that are synchronized to the received synchronization signal and multiplexed at a first optical wavelength. A second group of remote terminals transmits burst data signals in respective second timeslots that are synchronized to the received synchronization signal and multiplexed at a second optical wavelength. The first and second timeslots each include an active period during which burst data signals are transmitted and a guard period during which burst data signals are not transmitted. The first and second timeslots are synchronized such that respective active and guard periods are phase aligned with each other.

According to another aspect, a method of communicating between a central terminal and plural remote terminals over an optical network includes transmitting a TDM data signal having a synchronization signal from the central terminal to the remote terminals. Burst data signals are transmitted over the optical network from N groups of the remote terminals to the central terminal in respective TDMA timeslots that are synchronized to the received synchronization signal with each of the N groups operating at a different optical wavelength.

Another aspect of the present synchronization approach includes transmitting a common synchronization signal in each of a plurality of downstream TDM signals at respectively different optical wavelengths. Each remote terminal receives at least one of the plural downstream TDM signals containing the common synchronization signal.

A communication system in accordance with the present invention includes a passive optical network having downstream and upstream portions, a central terminal, and plural remote terminals coupled to the passive optical network for communicating with the central terminal. The central terminal transmits a synchronization signal to the remote terminals over the downstream network portion. A first group of the remote terminals transmits burst data signals to the central terminal in respective first timeslots that are synchronized to the received synchronization signal and multiplexed over the upstream network portion at a first optical wavelength. A second group of the remote terminals transmits burst data signals to the central terminal in respective second timeslots that are synchronized to the received synchronization signal and multiplexed over the upstream network portion at a second optical wavelength.

An advantage of the synchronization approach is that by avoiding interference between signals transmitted at closely spaced adjacent wavelengths, directly modulated laser transmitters can be used rather than more costly externally modulated laser transmitters.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
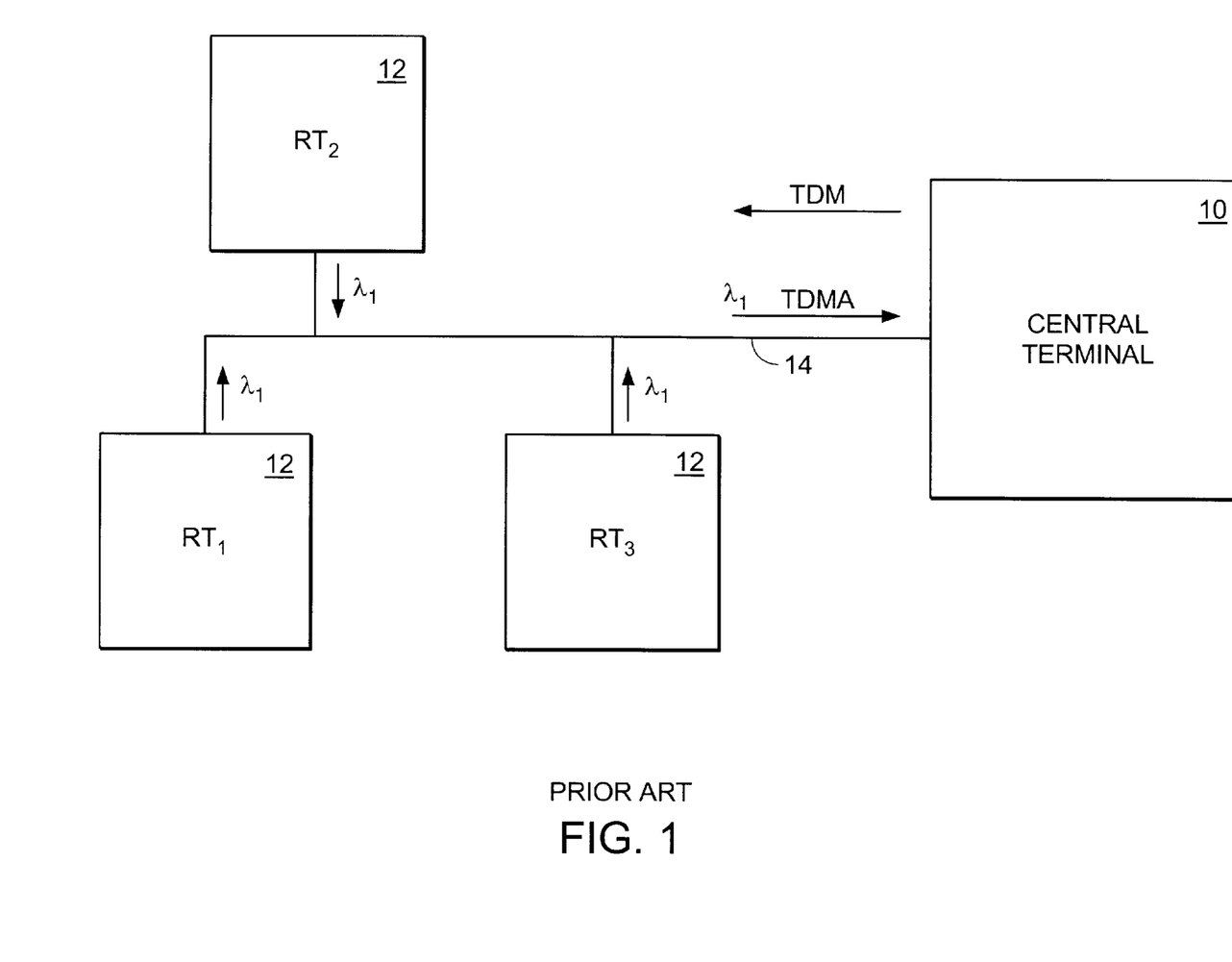
FIG. 1 is a block diagram of a conventional optical access system which uses TDMA upstream at a single optical wavelength.

FIG. 1 shows a block diagram of a conventional optical access system which includes a central terminal 10, remote terminals 12 designated $RT_1$, $RT_2$ and $RT_3$, and a passive optical network (PON) 14. The system provides a downstream data signal over the PON 14 from the central terminal 10 to the remote terminals 12 using time division multiplexing (TDM). An upstream data signal from the remote terminals 12 to the central terminal 10 over the PON 14 is provided in burst transmissions using time division multiple access (TDMA) at a common optical wavelength or wavelength band $\lambda_1$.

Note that the terms downstream and upstream are used herein to refer to the direction of transmission signal flow. The downstream direction refers to signals from the central terminal 10 toward the remote terminals 12. The upstream direction refers to signals from the remote terminals 12 toward the central terminal 10. Throughout the specification, the terms "optical wavelength" and "optical wavelength band" are used interchangeably.

Figures 2A, 2B:
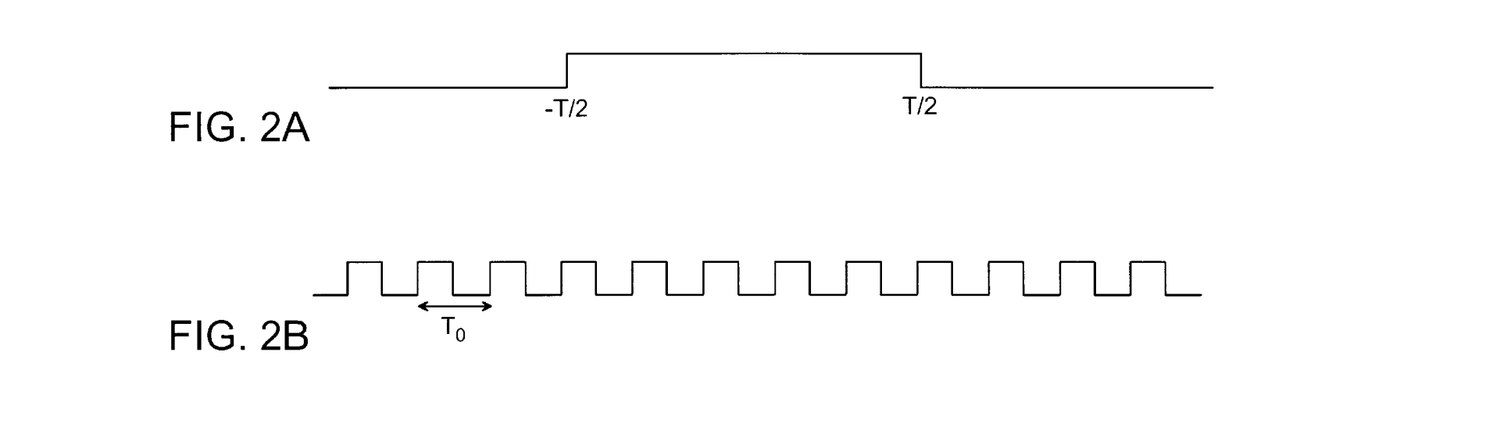
FIG. 2A illustrates a burst transmission time with period—T/2 to T/2.
FIG. 2B illustrates a baseband data signal which is used to modulate an optical carrier.
Figure 2C:
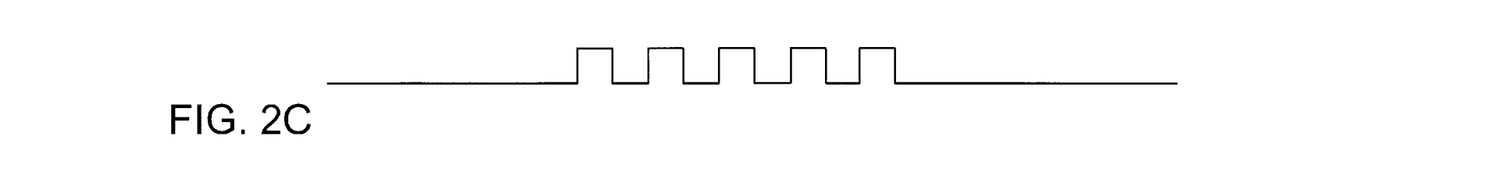
FIG. 2C illustrates a burst transmission comprising the multiplication of the burst transmission time shown in FIG. 2A and the baseband data signal shown in FIG. 2B.
Figure 3:
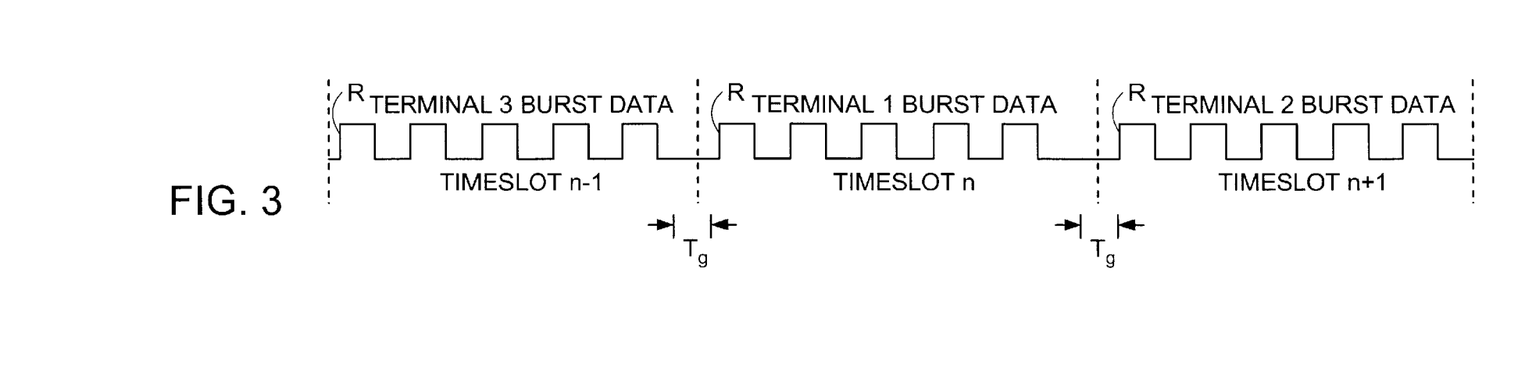
FIG. 3 illustrates a TDMA signal comprising burst transmissions in successive timeslots generated by respective remote terminals in the system of FIG. 1.

Each remote terminal 12 includes an optical transmitter (not shown) which is enabled only part of the time (the burst transmission time or active time), during which it is directly modulated by on-off keying, the most common method of encoding binary data onto an optical transmission path. The burst transmission time is shown in FIG. 2A with period— T/2 to T/2. A baseband data signal which is used to modulate the optical carrier of the transmitter is shown in FIG. 2B. A single TDMA burst comprising the multiplication of two signals, namely, burst transmission time (FIG. 2A) and baseband data signal (FIG. 2B), is shown in FIG. 2C. FIG. 3 shows the complete signal on the PON 14 generated when the remote terminals $RT_1$, $RT_2$ and $RT_3$ (FIG. 1) transmit data in multiple timeslots (n−1, n, n+1) using TDMA at a single optical wavelength.

Using conventional ranging techniques, the proper ranging delay is calculated for each remote terminal to account for the corresponding propagation delay and the burst transmissions are timed to occur in accordance with assigned timeslots, e.g., remote terminal $RT_3$ transmits in timeslot n−1, $RT_1$ transmits in timeslot n, and $RT_2$ transmits in timeslot n+1. Note that the bursts generated by each terminal are not phase aligned with bursts from other terminals, i.e., the start of the first rising edge R of each burst does not occur at regular intervals. At the end of each timeslot there is a guard time $T_g$ before the next TDMA burst during which no useful data is transmitted so as to avoid overlapping of bursts in adjacent timeslots.

Figure 4:
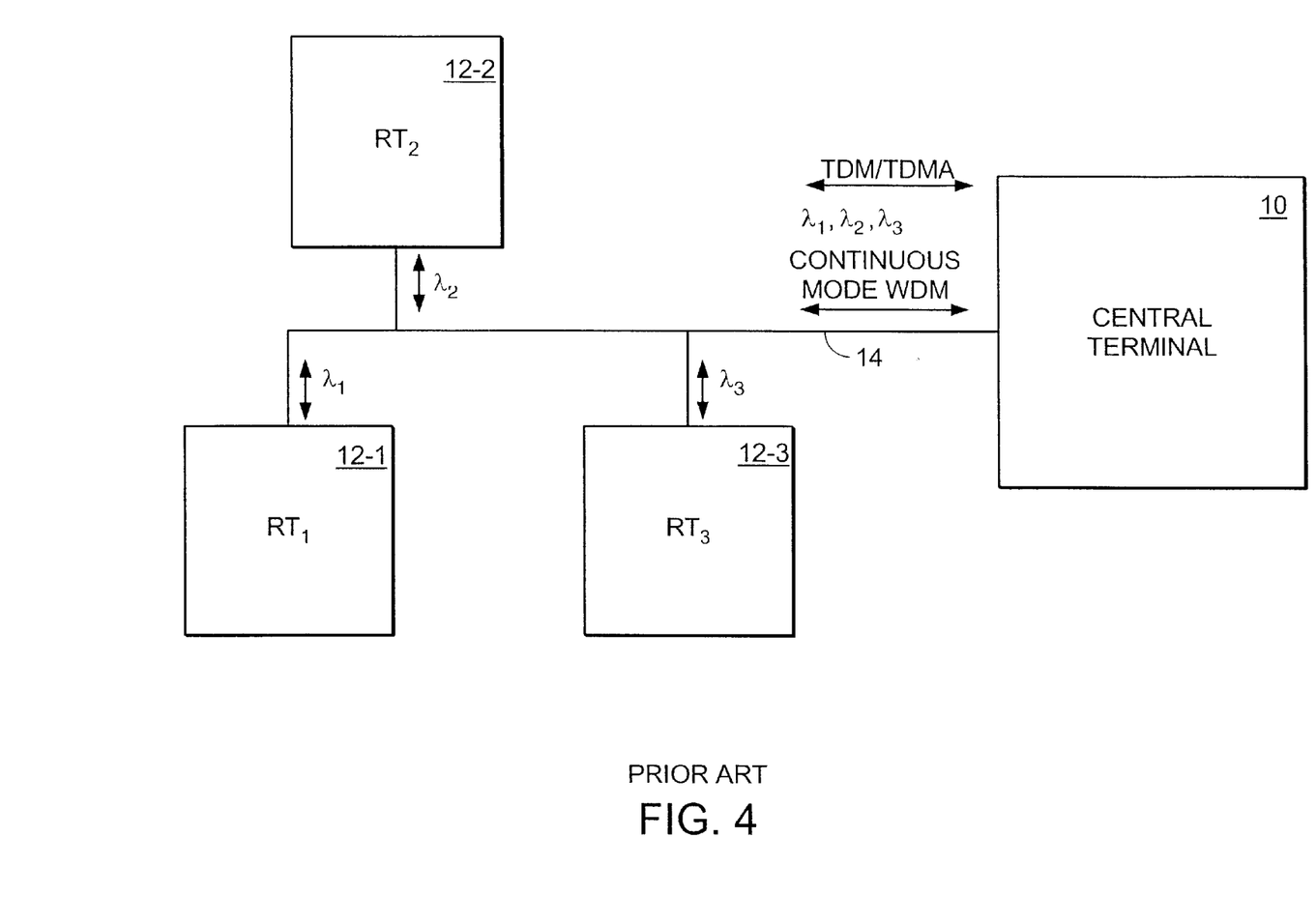
FIG. 4 is a block diagram of a conventional optical access system which uses continuous mode WDM transmission.

FIG. 4 shows a block diagram of a conventional optical access system which continuous mode WDM for bidirectional transmission. The system includes a central terminal 10, remote terminals 12-1, 12-2, 12-3 and a PON 14. The system provides a bi-directional data signal over the PON 14 between the central terminal 10 and the remote terminals 12-1, 12-2, 12-3 using TDM/TDMA. Bi-directional data signals between the remote terminals 12-1, 12-2, 12-3 and the central terminal 10 over the PON 14 are provided using continuous mode WDM, i.e., continuous mode transmissions at separate optical wavelengths $\lambda_1$, $\lambda_2$, and $\lambda_3$.

The following sections describe several problems that are encountered in both the time domain and the frequency domain with burst mode (TDMA) transmission.

In optical TDMA transmission, a burst of transmitted data is generated by first enabling one, and only one, optical transmitter and then some time later modulating the transmitted optical power with the data to be transmitted during the burst. To complete the burst, the transmitter is disabled some time after completing the transmission of the data in that burst.

If the optical transmitter is a laser diode, the transmitter is enabled by increasing the forward bias current through the laser diode from a value below threshold until it is slightly above the threshold current at which the diode begins to lase. This enabling process cannot be done instantaneously; however, once the laser reaches steady state at its enabled bias current, it can be modulated in the same way that it is modulated when used in a continuous mode, e.g., using on-off keying.

In a manner that is the reverse of the enabling process, the laser diode optical transmitter is disabled by decreasing its bias current from just above threshold to a value somewhere below threshold. For TDMA optical transmission, the laser bias current at which the transmitter is disabled must be small enough so that the optical energy at the receiver contributed by all of the disabled optical transmitters does not interfere with detection and decoding of the data transmitted by the one enabled laser on the network.

With the single wavelength TDMA method, a significant limitation with respect to how close in time sequential bursts can be is the time it takes the lasers to reach steady state when being enabled or disabled. This is a purely time domain problem because the optical receivers used in current TDMA systems have a broad enough and flat enough response in the optical frequency domain that any shifting or spreading of the transmitted optical spectrum when the lasers are enabled and disabled is negligible compared to the optical passband of the receiver.

The optical frequency spectrum or, equivalently, the optical wavelength linewidth of a signal transmitted by a laser diode using TDMA techniques is wider than the optical spectrum of an unmodulated continuous wave (CW) optical carrier signal. This optical linewidth broadening of a modulated laser diode can be due to one of two different effects:

(a) If the CW spectrum of the laser is much narrower than the bandwidth of the baseband modulating signal, then, based on Fourier transform theory, the bandwidth of the modulated optical signal is equal to the bandwidth of the baseband signal.

(b) If the CW spectrum of the laser is much wider than the bandwidth of the baseband modulating signal, then the bandwidth of the modulated optical signal is determined by a physical phenomena called "linewidth enhancement" or "frequency chirp".

Effect (a) is familiar to practitioners in the field of radio frequency (RF) communications because in those applications the bandwidth of the RF source is a small percentage of the bandwidth of the modulating signal. This is not true for the directly modulated laser diodes used as optical sources in today's TDMA optical networks.

One of the theories behind effect (b) is known as the "adiabatic chirp" theory. According to this theory, modulation of the forward current in a semiconductor laser diode causes a modulation of the carrier (hole and electron) density in the active region of the device. Carrier density modulation, in turns causes a modulation of the optical susceptibility and the refractive index of the lasing medium. Since the optical frequency of resonance in the laser diode cavity depends on the index of refraction of the cavity, a modulation of the refractive index leads to optical frequency modulation of the laser output. This is the phenomenon that determines the steady-state bandwidth/linewidth of the optical signal in a TDMA network during a burst.

The situation is more complicated at the beginning of a burst where both thermal chirp and adiabatic chirp can be encountered. When the laser bias current is enabled at the beginning of a burst, an almost instantaneous adiabatic increase in the laser frequency occurs. However, since the disabled laser current is below the lasing threshold, this turn-on adiabatic frequency shift merely represents the initial lasing frequency at the laser diode injection current corresponding to a logic "0". This level of injection current does, however, begin heating the diode with a time constant determined by the physical size and structure of the laser. Thermal time constants ranging from 10 ns to 400 ns have been observed in typical laser diodes used in communication applications. Thus, after the laser is enabled for a TDMA burst, but before it is modulated by the data, the optical output frequency of the laser exponentially decreases from its initial value with a time constant equal to the thermal chirp time constant of the laser diode.

Once the laser is directly modulated, both the adiabatic chirp level and the thermal equilibrium of the laser change again. The adiabatic chirp during modulation appears as a broadening of the laser linewidth due to intensity modulation-to-frequency modulation (IM-to-FM) conversion. The laser diode begins heating again once the modulation starts because the average injected current during modulation is larger than the bias current at the logic "0" level. In fact, if the modulating data signal has an equal number of "1"s and "0"s during the burst (which is usually the case), then the average injected current is just the (enabled) bias current plus one-half of the peak-to-peak modulation current. In any event, it takes about 3 thermal time constants before the center wavelength of the laser optical spectrum reaches 95% of its steady-state value (as measured from its initial value) during the TDMA burst.

At the end of a burst, optical frequency shifts occur opposite to those that occurred at the beginning of the burst. When the modulation stops at the logic "0" bias current, the lasing frequency decreases almost instantaneously due to adiabatic chirping, but will begin increasing because of the slower thermal chirp as the laser cools. Finally, when the laser is disabled and the bias current is taken well below threshold, no light is emitted by the laser, but it will continue to cool until it is enabled again. The disable time relative to the thermal time constant determines the initial thermal conditions of the laser diode when it is next enabled.

The optical bandwidth of the typical detector used in a TDMA optical receiver is extremely wide compared to the linewidth of the TDMA transmitter. A typical detector bandwidth covers wavelengths from 1000 nm to 1600 nm, equivalent to a frequency bandwidth of more than 100 THz. Worst case measured linewidths for directly modulated InGaAsP/InP multiple quantum well Fabry-Perot (MQW-FP) semiconductor lasers are less than 10 nm (equivalent frequency bandwidth of about 2 THz), and the steady-state shift in center wavelength from −40° C. to +85° C. case temperature may be less than 100 nm (equivalent frequency bandwidth of about 20 THz). Thus, for single wavelength TDMA, the optical frequency chirping due to either adiabatic (IM-to-FM) or thermal effects may be ignored. However, if TDMA signals are transported simultaneously over multiple optical wavelengths on shared optical fiber, the effect of these frequency shifts must be considered more carefully to prevent crosstalk from one TDMA timeslot on one wavelength channel into a corresponding TDMA timeslot on another wavelength channel. The present invention provides approaches that avoid such crosstalk.

The principles of the present invention are now described with reference to embodiments in a passive optical network. However, it should be understood that the principles of the present invention are applicable to other shared medium networks that use burst mode transmission.

Figure 5:
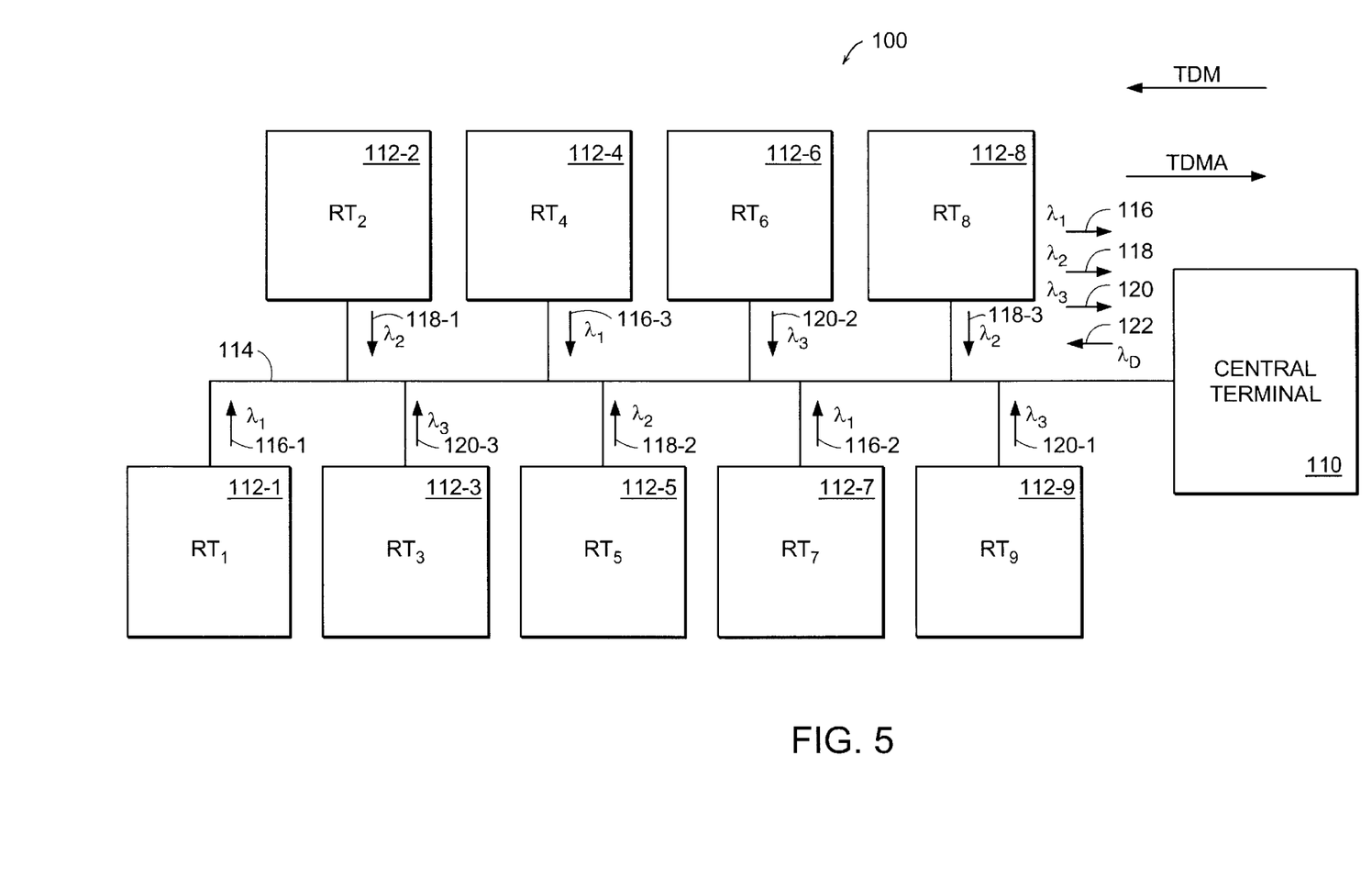
FIG. 5 is a block diagram of an embodiment of an optical access system which uses burst mode transmission at multiple optical wavelengths.

Referring to FIG. 5, a block diagram of an embodiment of an optical access system 100 is shown. The system 100 includes a central terminal 110, remote terminals 112-1, 112-2, . . . 112-9 designated $RT_1$, $RT_2$, . . . $RT_9$ and a passive optical network (PON) 114. The system provides a downstream TDM data signal 122 at optical wavelength $\lambda_D$ from the central terminal 110 to the remote terminals 112. The system 100 differs from the system shown in FIG. 1 in that multiple optical wavelengths are used upstream. The system 100 also differs from the system shown in FIG. 4 in that burst mode transmissions are used upstream.

In particular, three upstream TDMA data signals 116, 118 and 120 at corresponding optical wavelengths $\lambda_1$, $\lambda_2$, and $\lambda_3$ are shown being received at the central terminal from the remote terminals on the same fiber. The first upstream data signal 116 at wavelength $\lambda_1$ consists of burst transmissions 116-1, 116-2 and 116-3 from corresponding remote terminals $RT_1$ 112-1, $RT_7$ 112-7 and $RT_4$ 112-4. The second upstream data signal 118 at wavelength $\lambda_2$ consists of burst transmissions 118-1, 118-2 and 118-3 from corresponding remote terminals $RT_2$ 112-2, $RT_5$ 112-5 and $RT_8$ 112-8. The third upstream data signal 120 at wavelength $\lambda_3$ consists of burst transmissions 120-1, 120-2 and 120-3 from corresponding remote terminals $RT_9$ 112-9, $RT_6$ 112-6 and $RT_3$ 112-3.

It should be apparent that the number of remote terminals, the number of optical wavelengths, the assignment of timeslots and the grouping of remote terminals can vary in other embodiments and that the particular selections shown in the embodiment of FIG. 5 are merely for convenience in describing the principles of the invention and are not meant to limit the scope of the invention. It should also be noted that the principles of the present invention are applicable to any PON topology (e.g., tree-branch, doublestar).

Figure 6:
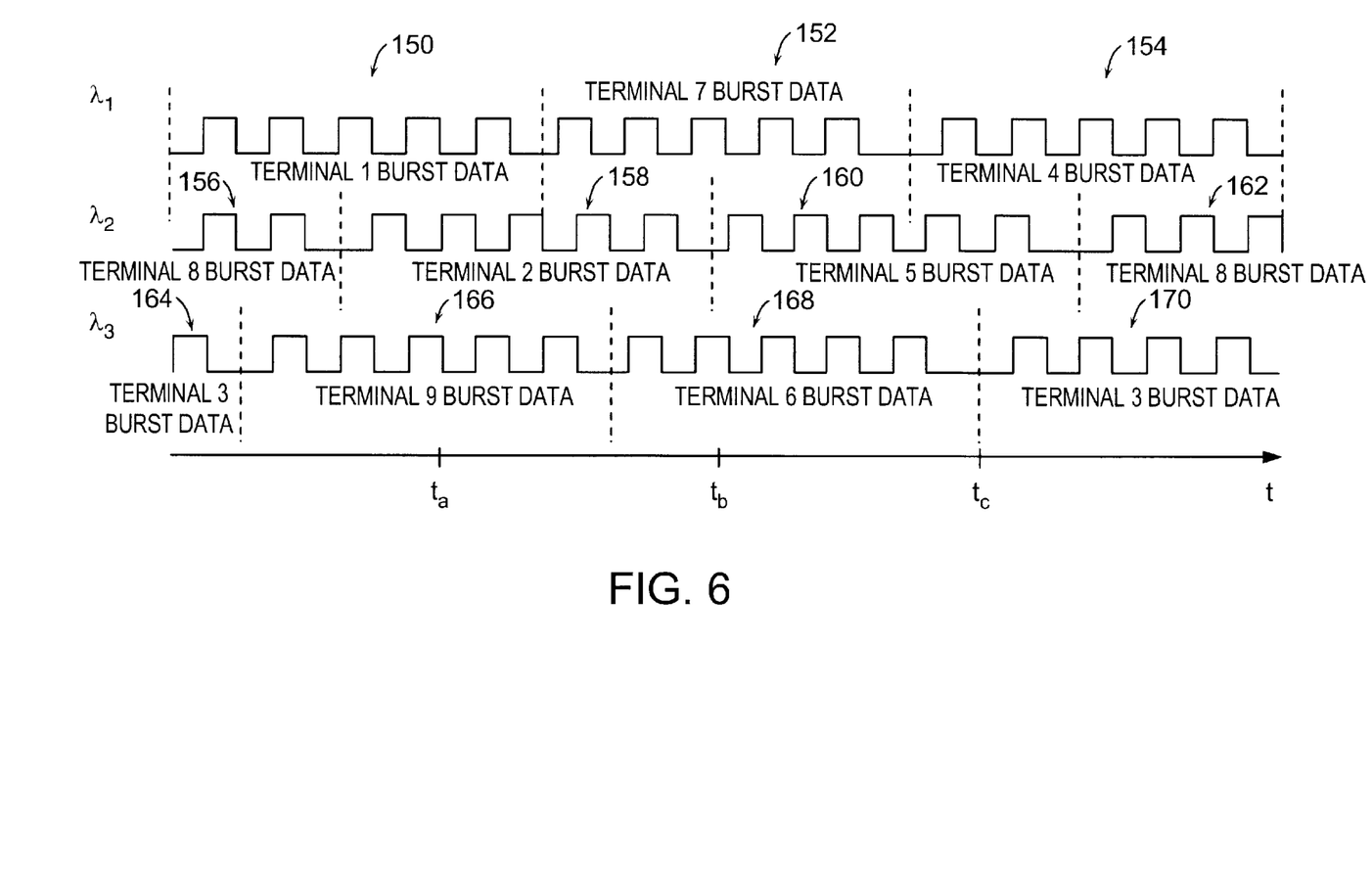
FIG. 6 illustrates unsynchronized and non-aligned TDMA signals at three different optical wavelengths.

FIG. 6 shows the upstream signals at corresponding wavelengths $\lambda_1$, $\lambda_2$, and $\lambda_3$ in an embodiment of the system of FIG. 5 in which the TDMA bursts on one wavelength have no fixed time relationship, i.e., are unsynchronized, with respect to the TDMA bursts on another wavelength. The TDMA signal at wavelength $\lambda_1$ includes burst transmissions from remote terminals $RT_1$, $RT_7$, and $RT_4$ in corresponding timeslots 150, 152 and 154. The TDMA signal at wavelength $\lambda_2$ includes burst transmissions from remote terminals $RT_8$, $RT_2$, and $RT_5$ in corresponding timeslots 156, 158 and 160. Timeslot 162 corresponds to the next burst transmission from $RT_8$. The TDMA signal at wavelength $\lambda_3$ includes burst transmissions from remote terminals $RT_3$, $RT_9$, and $RT_6$ in corresponding timeslots 164, 166 and 168. Timeslot 170 corresponds to the next burst transmission from $RT_3$.

The lack of synchronization and phase alignment can be understood by noting, for example, that the burst transmission in timeslot 150 from $RT_1$ at wavelength $\lambda_1$ overlaps in time the burst transmissions in timeslots 156 and 158 at wavelength $\lambda_2$ and the burst transmissions in timeslots 164 and 166 at wavelength $\lambda_3$. Consider now the case in which the wavelengths $\lambda_1$, $\lambda_2$, and $\lambda_3$ are spaced as close as is possible for steady-state continuous mode WDM operation.

Figure 7A:
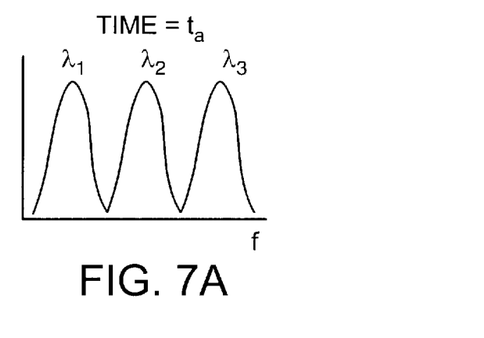
FIGS. 7A, 7B and 7C illustrate the optical frequency spectra of the unsynchronized TDMA signals of FIG. 6 at respective time points $t_a$, $t_b$, and $t_c$ for closely spaced optical wavelengths.
Figure 7B:
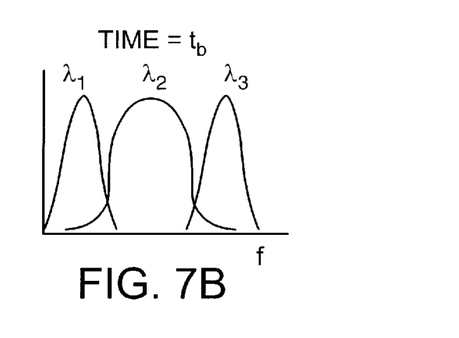
Figure 7C:
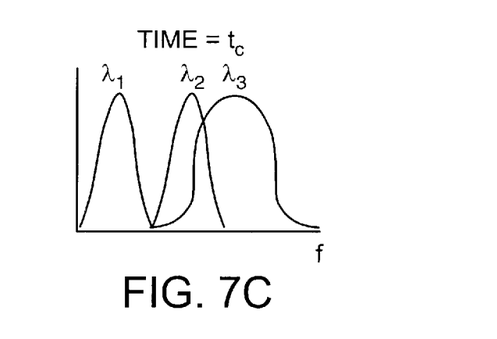

At time $t_a$ it can be assumed that a steady state optical spectrum has been reached for all three TDMA signals. The corresponding optical spectrum for each TDMA signal at time $t_a$, shown in FIG. 7A, indicates that there is no optical crosstalk interference. However, at time $t_b$, when the laser transmitter at optical wavelength $\lambda_2$ for $RT_5$ is enabled to begin the burst transmission in timeslot 160, interference with the adjacent wavelength channels $\lambda_1$ and $\lambda_3$ due to spectral broadening or center wavelength shifting or both for the TDMA signal at wavelength $\lambda_2$ occurs as shown in FIG. 7B. Likewise, at time $t_c$, when the laser transmitter at optical wavelength $\lambda_3$ for $RT_3$ is enabled to begin the burst transmission in timeslot 170, interference between the adjacent wavelength channel $\lambda_2$ and wavelength $\lambda_3$ due to spectral broadening or center wavelength shifting or both for the TDMA signal at wavelength $\lambda_3$ occurs as shown in FIG. 7C. Data can be recovered easily at time $t_a$, but at times $t_b$ or $t_c$, frequency components from adjacent optical wavelength channels interfere with the data recovery of another channel. This can cause loss of data in a closely spaced wavelength channel arrangement.

One option to reduce the impact of the type of interference described above is to increase the complexity of the optical transmitter to eliminate the unwanted frequency components at their source. However, such complexity is costly.

Figure 8A:
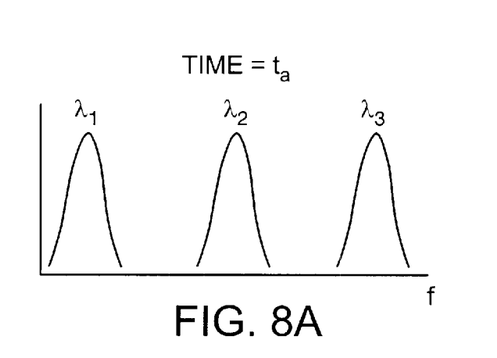
FIGS. 8A, 8B and 8C illustrate the optical frequency spectra of unsynchronized TDMA signals at respective time points $t_a$, $t_b$, and $t_c$ for optical wavelengths that are spaced apart to avoid crosstalk interference.

An approach of the present invention is to space the optical wavelengths far enough apart to put them outside the effect of the spurious frequency components. This approach can be understood with reference to the optical spectra shown in FIGS. 8A, 8B and 8C for respective time points $t_a$, $t_b$, and $t_c$ of FIG. 6. By spacing the optical wavelengths apart sufficiently, the interference effects noted above with close optical spacing can be avoided.

Figure 8B:
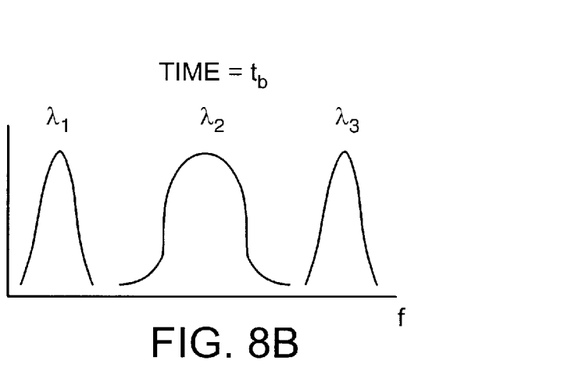
Figure 8C:
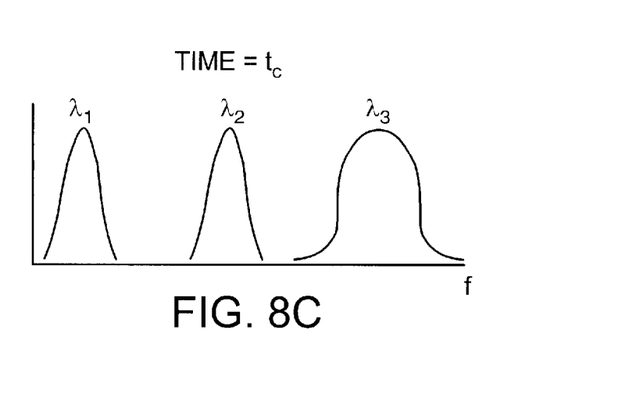

Thus, the corresponding optical spectrum for each TDMA signal at time $t_a$, shown in FIG. 8A, again indicates that there is no optical crosstalk interference. At time $t_b$, when the laser transmitter at optical wavelength $\lambda_2$ for $RT_5$ is enabled to begin the burst transmission in timeslot 160, interference with the adjacent wavelength channels $\lambda_1$ and $\lambda_3$ due to spectral broadening or center wavelength shifting or both for the TDMA signal at wavelength $\lambda_2$ is avoided as shown in FIG. 8B. Likewise, at time $t_c$, when the laser transmitter at optical wavelength $\lambda_3$ for $RT_3$ is enabled to begin the burst transmission in timeslot 170, interference between the adjacent wavelength channel $\lambda_2$ and wavelength $\lambda_3$ due to spectral broadening or center wavelength shifting or both for the TDMA signal at wavelength $\lambda_3$ is avoided as shown in FIG. 8C. Data can be recovered easily at time $t_a$, $t_b$ and $t_c$, since frequency components from adjacent optical wavelength channels do not interfere with the data recovery of another channel.

Another approach of the present invention allows wavelengths to be closely spaced (on the order of 200 GHz with today's technology) without the need to increase optical transmitter complexity. This approach is implemented by synchronizing and phase aligning every optical TDMA transmitter in the system to a common signal. An advantage of this approach is that by avoiding interference between signals transmitted at closely spaced adjacent wavelengths, less costly directly modulated laser transmitters can be used rather than externally modulated laser transmitters.

Figure 9:
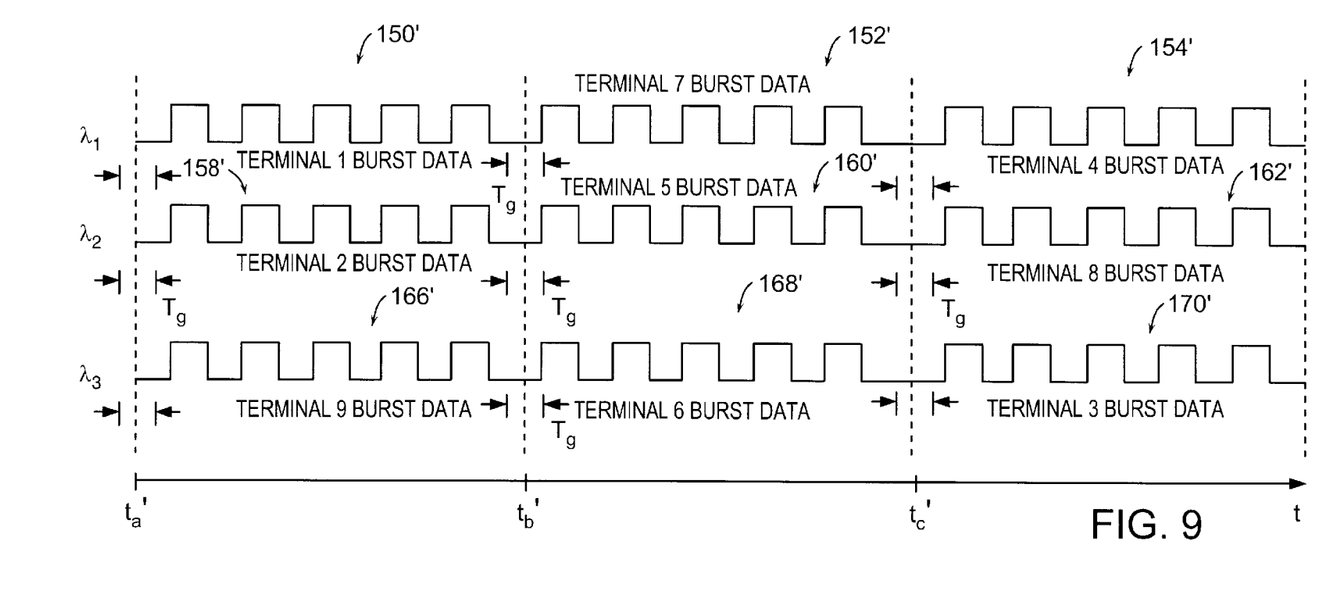
FIG. 9 illustrates synchronized and phase aligned TDMA signals at three different optical wavelengths for the system shown in FIG. 5.

FIG. 9 illustrates synchronized upstream TDMA signals at corresponding wavelengths $\lambda_1$, $\lambda_2$, and $\lambda_3$ for the system shown in FIG. 5 using the approach of the present invention wherein the TDMA bursts on one wavelength have a fixed time relationship, i.e., are synchronized and phase aligned, with respect to the TDMA bursts on another wavelength. In particular, the TDMA signal at wavelength $\lambda_1$ includes burst transmissions from remote terminals $RT_1$, $RT_7$, and $RT_4$ in corresponding timeslots 150', 152' and 154'. The TDMA signal at wavelength $\lambda_2$ includes burst transmissions from remote terminals $RT_8$, $RT_2$, and $RT_5$ in corresponding timeslots 158', 160' and 162'. The TDMA signal at wavelength $\lambda_3$ includes burst transmissions from remote terminals $RT_3$, $RT_9$, and $RT_6$ in corresponding timeslots 166', 168' and 170'.

The synchronization and phase alignment can be understood by noting, for example, that the burst transmission in timeslot 150' from $RT_1$ at wavelength $\lambda_1$ is aligned in time with the burst transmission in timeslot 158' at wavelength $\lambda_2$ and the burst transmission in timeslot 166' at wavelength $\lambda_3$. Likewise, timeslots 152', 160' and 168' and timeslots 154', 162' and 170' are respectively phase aligned. Note also that the corresponding guard times $T_g$, during which no useful data is transmitted, are likewise aligned. Since all of the bursts are aligned in time, the frequency components caused by laser turn on/turn off all occur at the same time. During the period between laser turn on/turn off, the frequency spectrum of each laser is the same as it is in steady-state (continuous mode) operation, and the signals on different wavelengths do not interfere with each other when the wavelengths are spaced as closely as is typical for continuous mode WDM transmission.

Figure 10A:
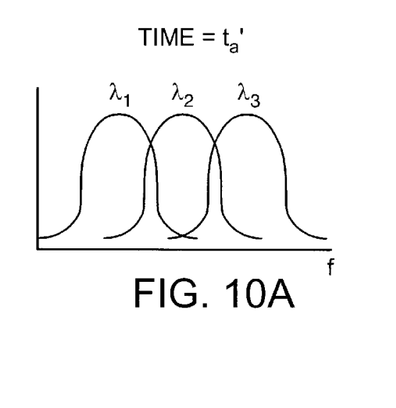
FIGS. 10A, 10B and 10C illustrate the optical frequency spectra of the synchronized and phase aligned TDMA signals of FIG. 9 at respective time points $t_a'$, $t_b'$, and $t_c'$.
Figure 10B:
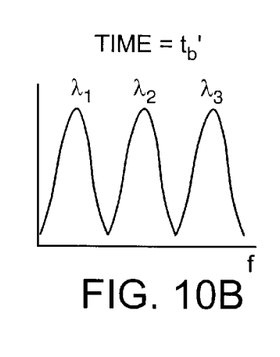
Figure 10C:
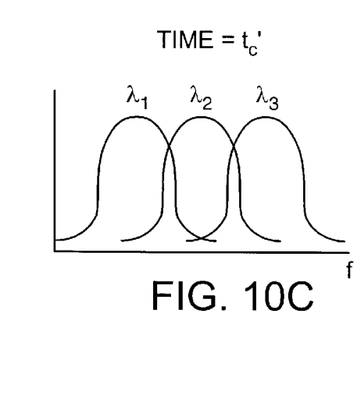

FIGS. 10A, 10B and 10C illustrate the frequency spectra of the synchronized TDMA signals of FIG. 9 at respective time points $t_a'$, $t_b'$, and $t_c'$. At time $t_a'$ the laser transmitter at optical wavelength $\lambda_1$ for $RT_1$ is enabled to begin the burst transmission in timeslot 150'. This coincides with enablement of the respective laser transmitters at optical wavelength $\lambda_2$ for $RT_2$ in timeslot 158' and at optical wavelength $\lambda_3$ for $RT_9$ in timeslot 166'. This time $t_a'$ occurs during the guard time $T_g$. Similarly, at time $t_c'$ the laser transmitter at optical wavelength $\lambda_1$ for $RT_4$ is enabled to begin the burst transmission in timeslot 154'. This coincides with enablement of the respective laser transmitters at optical wavelength $\lambda_2$ for $RT_8$ in timeslot 162' and at optical wavelength $\lambda_3$ for $RT_3$ in timeslot 170'. At these times $t_a'$ and $t_c'$, interference occurs between adjacent wavelength channels $\lambda_1$ and $\lambda_2$ and between adjacent wavelength channels $\lambda_2$ and $\lambda_3$ due to spectral broadening or center wavelength shifting or both for each TDMA signal as shown in FIGS. 10A and 10C, respectively. However, since this interference occurs during the guard time, there is no data loss. At time $t_b'$ it can be assumed that steady state optical spectrum has been reached for all three TDMA signals. The corresponding optical spectrum for each TDMA signal at time $t_b'$, shown in FIG. 10B, indicates that there is no optical crosstalk interference. Thus, data can be recovered easily at the appropriate times without loss of data due to crosstalk interference.

Figure 11A:
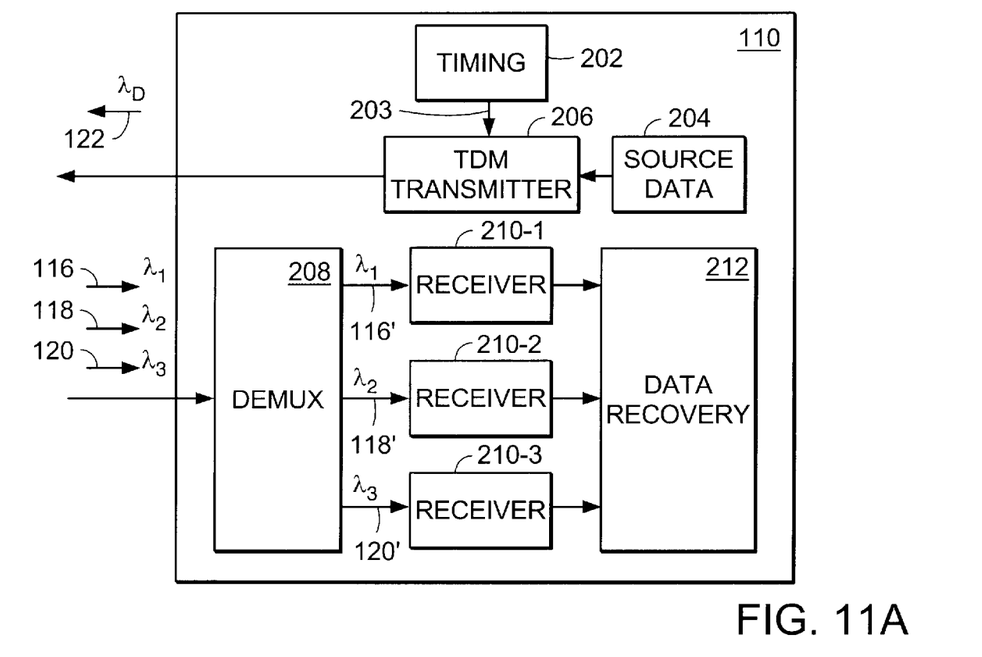
FIG. 11A is a block diagram of the central terminal of the system of FIG. 5.

Referring now to FIG. 11A, a block diagram of the central terminal 110 of system 100 (FIG. 5) is shown. The central terminal 110 comprises a downstream portion that includes a timing block 202, a source data block 204, and a TDM transmitter 206. An upstream portion includes an optical demultiplexer device 208, receivers 210-1, 210-2, 210-3 and a data recovery circuit 212. Other functions that the central terminal 110 may include which do not relate to the principles of the present invention, such as switching and network interfaces, are not shown.

In general, embodiments of the central terminal 110 derive system transmission timing either from a network source, such as a SONET transmission signal delivered to a network interface (not shown), or from a local stratum clock. The derived transmission timing is shown as timing block 202.

To generate a downstream TDM data signal 122, source data from block 204 is provided to a TDM transmitter 206 together with a synchronization signal 203 from timing block 202. In a system in which the downstream TDM signal is formatted as 125 µs frames, for example, the synchronization signal 203 comprises an 8 kHz frame sync signal. The TDM transmitter 206 transmits downstream TDM data signal 122 at optical wavelength $\lambda_D$ to each of the remote terminals 112 (FIG. 5).

In the upstream direction, three upstream TDMA data signals 116, 118 and 120 at corresponding optical wavelengths $\lambda_1$, $\lambda_2$, and $\lambda_3$ are received at the central terminal from the remote terminals (FIG. 5) on a shared medium optical network. As described herein above, these upstream TDMA data signals are synchronized and phase aligned with respect to each other based on the common synchronization signal 203 sent downstream to the remote terminals. The optical demultiplexer device 208 demultiplexes the three TDMA data signals to separate optical signals 116', 118' and 120', respectively, which are received in corresponding optical receivers 210-1, 210-2, 210-3. A conventional burst mode data recovery circuit 212 recovers data from the received signals without loss of data due to optical crosstalk interference.

Figure 11B:
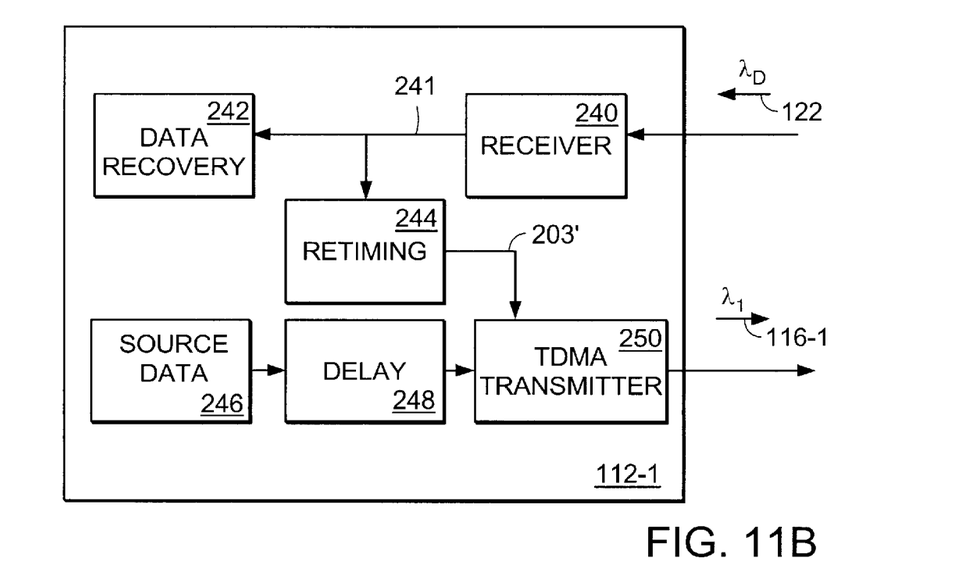
FIG. 11B is a block diagram of a remote terminal of the system of FIG. 5.

FIG. 11B is a block diagram of remote terminal 112-1 of the system of FIG. 5. The remote terminal includes an optical receiver 240, data recovery circuit 242, retiming block 244, source data block 246, delay block 248 and TDMA transmitter 250. In the downstream direction, downstream TFDM data signal 122 at optical wavelength $\lambda_D$ is received in optical receiver 240 and data is recovered in conventional data recovery circuit 242. Retiming block 244 derives synchronization signal 203' from the received signal 241. In the upstream direction, source data from block 246 is provided to TDMA transmitter 250 delayed by an appropriate ranging delay in block 248. TDMA transmitter 250 receives the derived synchronization signal 203' and transmits a burst transmission 116-1 at optical wavelength $\lambda_1$ in an assigned timeslot. Each of the remote terminals is similarly configured, except that each has its own ranging delay. Thus, with each remote terminal deriving synchronization from the common synchronization signal 203 sent from central terminal 110, the synchronization of TDMA signals at closely spaced optical wavelengths can be provided as described herein.

Figure 12:
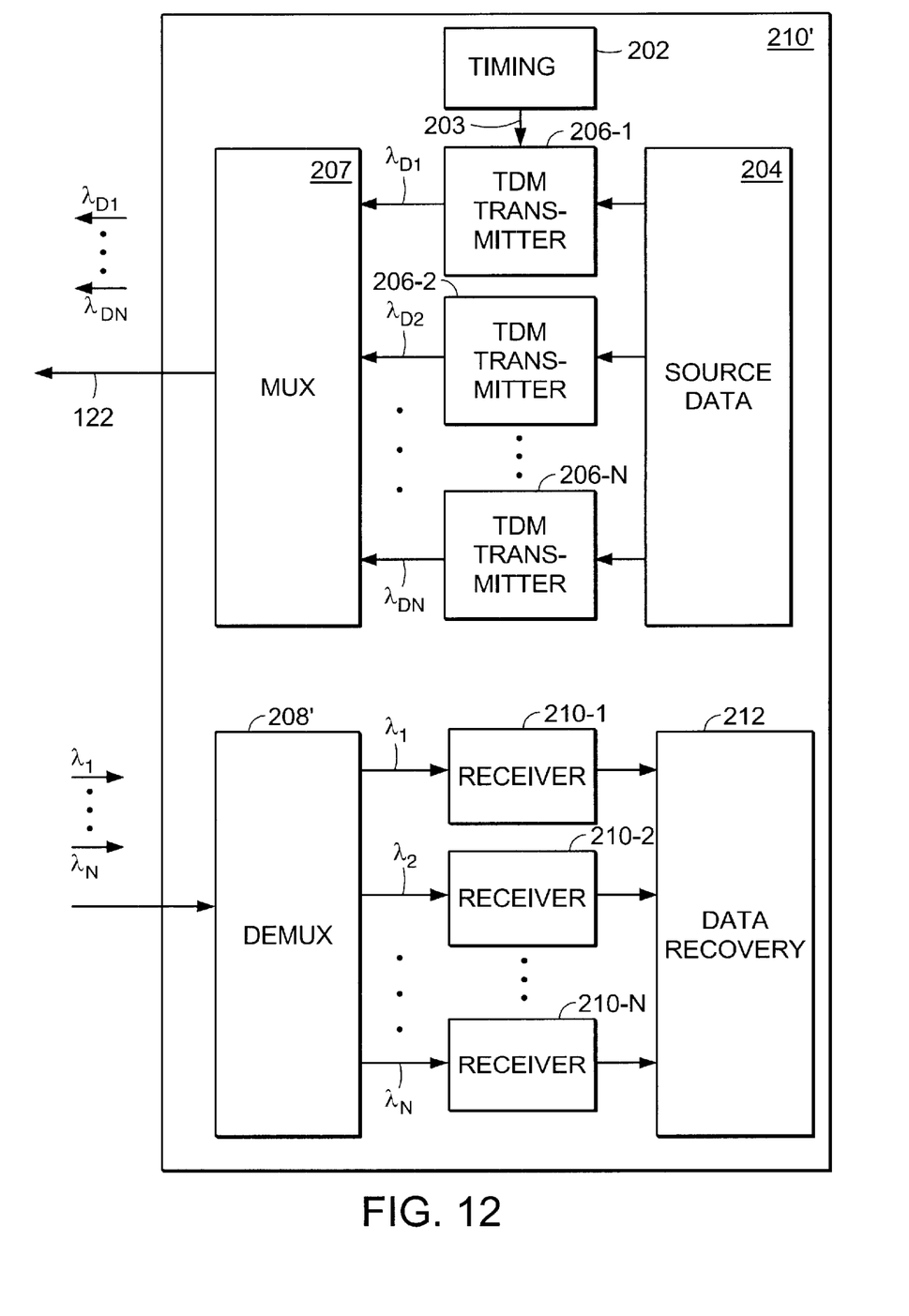
FIG. 12 is a block diagram of the central terminal of the system of FIG. 5 in generalized form.

Referring now to FIG. 12, a block diagram is shown of a central terminal 110' in generalized form for use in the system 100 (FIG. 5). The central terminal 110' comprises a downstream portion that includes a timing block 202, a source data block 204, multiple TDM transmitters 206-1, 206-2, . . . , 206-M and an optical multiplexer device 207. An upstream portion includes a demultiplexer device 208', receivers 210-1, 210-2, . . . , 210-N and a data recovery circuit 212.

In the downstream direction, source data from block 204 is provided to the TDM transmitters 206-1, 206-2, . . . , 206-M together with a synchronization signal 203 from timing block 202. The TDM transmitters 206-1, 206-2, . . . , 206-M transmit downstream data signals (including the synchronization signal 203) at respective optical wavelengths $\lambda_{D1}, \lambda_{D2}, \ldots \lambda_{DM}$ which are combined by multiplexer device 207 to provide downstream signal 122' to each of the remote terminals 112 (FIG. 5). Therefore, the remote terminals receive the downstream signal 122' which comprises multiple optical wavelengths $\lambda_{D1}, \lambda_1, \lambda_{D2}, \ldots, \lambda_{DM}$ each including the common synchronization signal 203. The remote terminals can thus recover the synchronization signal from any of the received downstream optical wavelengths $\lambda_{D1}, \lambda_1, \lambda_{D2}, \ldots, \lambda_{DM}$. Modifications to the embodiment of FIG. 11B to receive and recover the synchronization signal from any of the downstream optical wavelengths will be apparent to those skilled in the art.

In the upstream direction, multiple upstream TDMA data signals at respective optical wavelengths $\lambda_1, \lambda_2, \ldots, \lambda_N$ are received at the central terminal from N corresponding groups of remote terminals. In the generalized form, the upstream TDMA data signals are synchronized with respect to each other based on the common synchronization signal 203 recovered from downstream signal 122'. The demultiplexer device 208' demultiplexes the multiple TDMA data signals to separate optical signals $\lambda_1, \lambda_2, \ldots, \lambda_N$, respectively, which are received in corresponding optical receivers 210-1, 210-2, . . . , 210-N. The conventional burst mode data recovery circuit 212 recovers data from the received signals without loss of data due to optical crosstalk interference as noted above.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of communicating between a central terminal and plural remote terminals over a passive optical network having a downstream portion and an upstream portion, the method comprising:

transmitting a synchronization signal from the central terminal to the plural remote terminals over the downstream network portion and receiving the synchronization signal at the plural remote terminals;

transmitting burst data signals from a first group of the plural remote terminals to the central terminal in respective first timeslots synchronized to the received synchronization signal and multiplexed over the upstream network portion at a first optical wavelength;

transmitting burst data signals from a second group of the plural remote terminals to the central terminal in respective second timeslots synchronized to the received synchronization signal and multiplexed over the upstream network portion at a second optical wavelength;

wherein the first and second timeslots each include an active period during which burst data signals are transmitted and a guard period during which burst data signals are not transmitted and wherein respective first and second timeslots are synchronized such that respective active and guard periods are phase aligned with each other.

2. The method of claim 1 further comprising transmitting burst data signals from a third group of the plural remote terminals to the central terminal in respective third timeslots synchronized to the received synchronization signal and multiplexed over the upstream network portion at a third optical wavelength.

3. The method of claim 1 wherein transmitting the synchronization signal from the central terminal includes transmitting a common synchronization signal in each of a plurality of downstream TDM signals at respectively different optical wavelengths and wherein receiving includes receiving at least one of the plural downstream TDM signals containing the common synchronization signal.

4. A method of communicating between a central terminal and plural remote terminals over an optical network, the method comprising:

transmitting a TDM data signal having a synchronization signal from the central terminal to the plural remote terminals over the optical network and receiving the synchronization signal at the plural remote terminals;

transmitting burst data signals over the optical network from N groups of the plural remote terminals to the central terminal in respective TDMA timeslots synchronized to the received synchronization signal, each of the N groups operating at a different optical wavelength;

wherein the TDMA timeslots each include an active period during which burst data signals are transmitted and a guard period during which burst data signals are not transmitted and wherein respective TDMA timeslots transmitted at the N different optical wavelengths are synchronized such that respective active and guard periods are phase aligned with each other.

5. A communication system comprising:
a passive optical network having a downstream portion and an upstream portion;
a central terminal that includes a transmitter for transmitting a synchronization signal over the downstream network portion; and
a plurality of remote terminals coupled to the passive optical network for communicating with the central terminal, each remote terminal having a transmitter for transmitting burst data signals and a receiver for receiving the synchronization signal;

a first group of the plural remote terminals transmitting burst data signals to the central terminal in respective first timeslots synchronized to the received synchronization signal and multiplexed over the upstream network portion at a first optical wavelength; and a second group of the plural remote terminals transmitting burst data signals to the central terminal in respective second timeslots synchronized to the received synchronization signal and multiplexed over the upstream network portion at a second optical wavelength;

wherein the first and second timeslots each include an active period during which burst data signals are transmitted and a guard period during which burst data signals are not transmitted and wherein respective first and second timeslots are synchronized such that respective active and guard periods are phase aligned with each other.

6. The system of claim 5 wherein a third group of the plural remote terminals transmits burst data signals to the central terminal in respective third timeslots synchronized to the received synchronization signal and multiplexed over the upstream network portion at a third optical wavelength.

7. The system of claim 5 wherein the central terminal transmitter includes plural TDM transmitters for transmitting a common synchronization signal in each of a plurality of downstream TDM signals at respectively different optical wavelengths and wherein each remote terminal receiver is operable to receive at least one of the plural downstream TDM signals containing the common synchronization signal.

8. A communication system comprising:
a passive optical network having a downstream portion and an upstream portion;
a central terminal including a transmitter for transmitting a synchronization signal over the downstream network portion; and
a plurality of remote terminals coupled to the passive optical network for communicating with the central terminal, each remote terminal having a transmitter for transmitting burst data signals and a receiver for receiving the synchronization signal;
N groups of the plural remote terminals transmitting burst data signals to the central terminal in respective TDMA timeslots synchronized to the received synchronization signal and multiplexed over the upstream network portion at N different optical wavelengths;
wherein the TDMA timeslots each include an active period during which burst data signals are transmitted and a guard period during which burst data signals are not transmitted and wherein respective TDMA timeslots transmitted at the N different optical wavelengths are synchronized such that respective active and guard periods are phase aligned with each other.

9. The system of claim 8 wherein the central terminal transmitter includes plural TDM transmitters for transmitting a common synchronization signal in each of a plurality of downstream TDM signals at respectively different downstream optical wavelengths and wherein each remote terminal receiver is operable to receive at least one of the plural downstream TDM signals containing the common synchronization signal.

* * * * *